US005111238A

United States Patent [19]

Honerkamp

[11] Patent Number: 5,111,238

[45] Date of Patent: May 5, 1992

[54] FILM PROCESSING UNIT

[76] Inventor: Johannes Honerkamp, Ebbendorfer Strasse 14, 4517 Hilter, Fed. Rep. of Germany

[21] Appl. No.: 718,285

[22] Filed: Jun. 20, 1991

[30] Foreign Application Priority Data

Jun. 29, 1990 [DE] Fed. Rep. of Germany ....... 4020749

[51] Int. Cl.[5] ........................ C03B 27/52; C03B 27/62

[52] U.S. Cl. ........................................ 355/40; 355/75

[58] Field of Search ..................... 355/40, 41, 50, 123, 355/75; 352/232, 233; 354/354

[56] References Cited

U.S. PATENT DOCUMENTS 3,976,376 8/1976 Hujer ................................ 355/40 X 4,441,807 4/1984 Bartz ................................ 355/40

4,975,735 12/1990 Bright et al. .......................... 355/75

FOREIGN PATENT DOCUMENTS 3629923 3/1988 Fed. Rep. of Germany .

*Primary Examiner*—Richard A. Wintercorn

*Attorney, Agent, or Firm*—Laubscher, Presta & Laubscher

[57] ABSTRACT

A film processing unit includes a film strip (11) having an emulsion layer on one side thereof, a cover layer (13) extending generally over said emulsion layer and being spaced from one side edge of said film strip, a reorder strip (12) arranged coplanar with said film strip adjacent said one side edge, and an adhesive strip (14) adhesively connected with adjacent portions of said film strip, said reorder strip, and said cover layer, thereby to secure the same together.

8 Claims, 1 Drawing Sheet

FILM PROCESSING UNIT

STATEMENT OF THE INVENTION

A film processing unit is disclosed including a developed film strip having a layer of emulsion on one side thereof, a cover layer arranged over said emulsion layer in spaced relation to one side edge of said film strip, a reorder strip coplanar with said film strip adjacent said one side edge, and an adhesive strip adhesively connected with adjacent portions of said film strip, said cover layer, and said reorder strip.

BRIEF DESCRIPTION OF THE PRIOR ART

In the German patent No. DE-OS 36 29 923, a film processing unit is disclosed having two cover layers that protect the film strip on both sides. This model proved to be best in actual use because the film gets optimum protection. The cover layers are made of plastic foil. The material requirement and thus also the costs for it are high because of the bilateral protection of the film strip. It is generally known that the use of synthetic materials should be avoided as much as possible for reasons of environmental protection. But it is especially the cover layers of the film processing unit that must be made of transparent plastic foil.

The purpose of this invention is to create a film processing unit of the kind mentioned initially that can be made at reasonable cost and environmentally safe by saving material.

SUMMARY OF THE INVENTION

Accordingly, a primary object of the present invention is to provide a film processing unit including a film strip having an emulsion layer on only one side thereof, a cover layer at least partially covering said emulsion layer and spaced a given distance from one side edge of said film strip, a reorder strip coplanar with said film strip and adjacent said one side edge, and an adhesive layer adhesively connected with the adjacent portions of said film strip, said cover layer and said reorder strip, thereby to combine the same as a unit.

According to another object of the invention, the quantity of transparent plastic foil required for the cover layer is cut in half, or approximately in half, as compared to the film processing unit according to the prior art. The film strip is nevertheless protected adequately because the important thing is to protect the emulsion layer against scratches, fingerprints, or the like. In addition to the reduction of the material, one can moreover also lower the costs correspondingly.

The invention offers the further advantage that in order to connect the film strip, the cover layer, and the re-order strip, only one adhesive tape is needed, so that the necessary quantity will also be reduced by half as compared to the state of the art. Because the adhesive tape is also a plastic strip that is coated with a permanent adhesive, an additional contribution to environmental protection is afforded. The reduction in the quantity of plastic foil is quite considerable because the film processing units involved here must be considered to be a mass-produced item. Normally, in the case of a reorder, the cover layer remains on the film strip. But if it should be necessary to separate it from the film strip, the waste could be reused by means of a suitable process.

BRIEF DESCRIPTION OF THE DRAWINGS

Other objects and advantages of the invention will become apparent from a study of the following specification, when viewed in the light of the accompanying drawing, in which.

DETAILED DESCRIPTION

Figure 1:
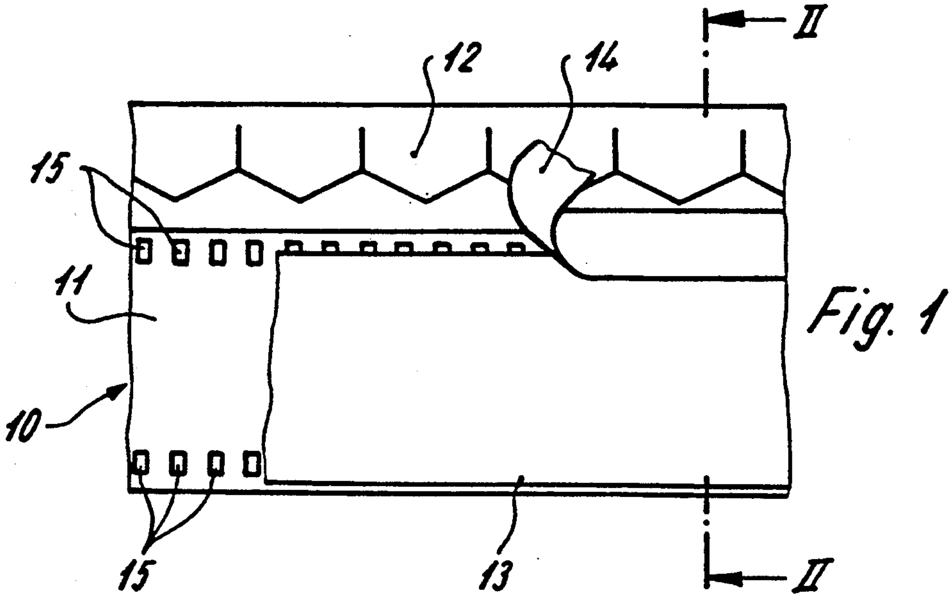
FIG. 1 is a plan view of a preferred embodiment of the invention.
Figure 2:
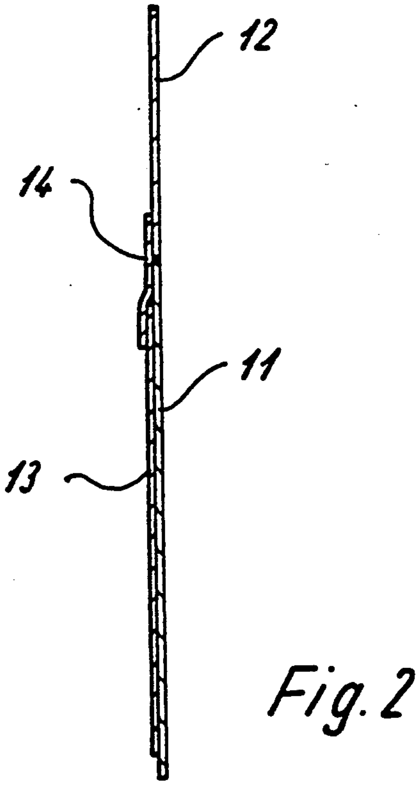
FIG. 2 is a sectional view taken along line II—II of FIG. 1.

Referring first more particularly to FIGS. 1 and 2, the film processing unit 10 includes a film strip 11 comprising a base layer on one side of which is provided an emulsion layer, a reorder strip 12 adjacent one side edge of the film strip, a cover layer 13 of transparent synthetic plastic foil arranged over the emulsion layer side of the film strip, and an adhesive strip 14 which covers the adjacent portions of the cover layer, the film strip, and the reorder strip. Film strip 11 is provided adjacent each of its two longitudinal edges with a column of sprocket holes 15 that form transport perforations. Film strip 11 and reorder strip 12 are placed next to each other in a common plane with their adjacent edges abutting each other. In contrast to the version shown, they can also be spaced at a relatively small interval relative to each other. The edge of cover layer 13, which faces toward reorder strip 12, runs roughly centrally through the associated sprocket holes 15. The opposite, freely movable edge of cover layer 13, in the illustration according to FIG. 1, protrudes beyond the associated sprocket holes. It is at a relatively short distance from the edge of film strip 11 that faces away from reorder strip 12. The width of cover layer 13 could be even less because it need extend only between sprocket holes 15. This would result in the least possible material requirement for cover layer 13. As shown in the figures, reorder strip 12 is considerably narrower than film strip 11. In the practical example, shown, film strip 11 is about twice as wide as reorder strip 12. The width of adhesive strip 14 is considerably less than the width of reorder strip 12. As customary in this product line, the width of the adhesive strip is 6 mm, that of the reorder strip is between 14 and 27 mm, although preferably between 14 and 19 mm. Adhesive strip 14 is placed thusly with respect to mutually associated edges of cover layer 13, of film strip 11, and of reorder strip 12 that one-third of the width of adhesive strip 14 covers the margin of cover layer 13 and one-third of the width covers reorder strip 12. These mentioned areas are the particular outer areas of adhesive strip 14. The middle area, which again amounts to ⅓ of the width, covers the marginal area of film strip 11. Because the covered margin areas are equal, a durable connection is provided. The film processing unit according to the invention can deviate from the practical example illustrated in numerous ways. The essential thing here is to have the single adhesive strip 14 engage the smallest possible portions of the cover strip 13, film strip 11, and reorder strip 12 while at the same time making a secure connection between these components.

Figure 3:
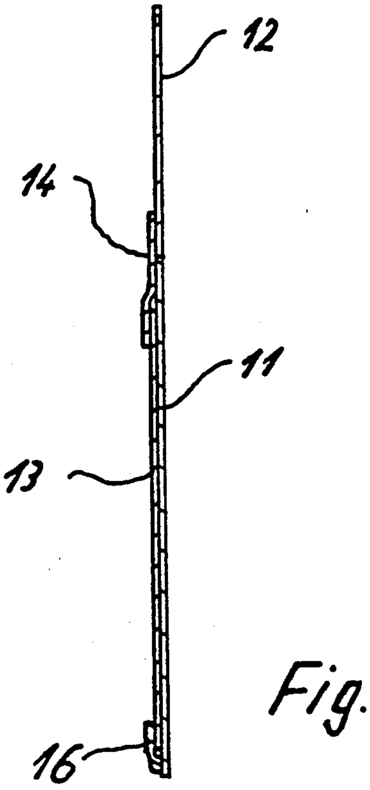
FIG. 3 is a corresponding sectional view of a second embodiment of the invention.

FIG. 3 shows a film processing unit with a second adhesive strip 16 that connects the side margins remote from reorder strip 12 of film strip 11 and of cover layer 13. For this purpose, the edge of cover layer 13 is spaced with respect to the corresponding edge of the film strip. This edge, for example, coincides with the edges of sprocket holes 15 that are positioned so that they face away from reorder strip 12. The edge of adhesive strip 16, that faces away from reorder strip 12, coincides with the edge of film strip 11 or it can be offset a small bit in the direction toward the reorder strip 12. The important thing is to secure cover layer 13 on film strip 11 in such a manner that the film processing unit can be transported by means of transport rollers. In the practical examples according to FIGS. 1 and 2, these transport rollers engage film processing unit 10 in the abutment area between film strip 11 and reorder strip 12 upon adhesive strip 14. Transport is also necessary so that the film processing unit, following its production, can be transported into a series-connected cutting mechanism. In the existing cutting mechanisms, it can happen that they are so designed that the transport rollers sit upon the outer area that faces away from reorder strip 12. The solution shown in FIG. 3 is now offered because retrofitting or new procurement would not be acceptable for economic reasons. If adhesive strip 16 were to be absent, the cover layer 13 would become wrinkled or form folds.

While in accordance with the Patent Statutes, the preferred forms and embodiments have been illustrated and described. It will be apparent that various changes may be made without deviating from the concepts set forth above.

What is claimed is:

1. A film processing unit, comprising:

(a) a developed film strip (11) including a base layer, and an emulsion layer on one side of said base layer;

(b) a reorder strip (12) coplanar with and arranged adjacent one side edge of said film strip;

(c) a cover layer (13) at least partially covering said emulsion layer on said film strip, one side edge of said cover layer adjacent said reorder strip being slightly spaced from the adjacent side edge of said film strip; and (d) an adhesive strip (14) extending at least partially over, and in adhesive engagement with, the adjacent portions of said film strip, said cover layer and said reorder strip, thereby to connect together said film strip, said reorder strip, and said cover layer.

2. A film processing unit as defined in claim 1, wherein the widths of the portions of said film strip and said cover layer that are covered by said adhesive strip are generally equal.

3. A film processing unit as defined in claim 2, wherein the width dimension of each of the portions of said film strip, said reorder strip and said cover layer that are covered by the adhesive strip is generally equal to one-third of the width dimension of said adhesive strip.

4. A film processing unit as defined in claim 1, wherein said film strip contains a longitudinally extending column of sprocket holes (15) adjacent the side edge thereof that is adjacent said reorder strip, the side edge of said cover layer adjacent said reorder strip extending generally through the centers of said sprocket holes.

5. A film processing unit as defined in claim 1, wherein said film strip contains adjacent the edge thereof adjacent said reorder strip a column of non-circular sprocket holes (15), said sprocket holes having a major transverse dimension that extends in a direction away from said reorder strip.

6. A film processing unit as defined in claim 1, wherein the other side edge of said cover layer terminates in spaced relation relative to the corresponding other side edge of said film strip, and further including a second adhesive strip (16) securing said other edge portion of said cover layer with said film strip.

7. A film processing unit as defined in claim 6, wherein the side edge of said second adhesive strip remote from said reorder strip lies generally flush with the corresponding side edge of said film strip.

8. A film processing unit as defined in claim 6, wherein said film layer contains a longitudinal column of sprocket holes adjacent each side edge thereof, said cover layer completely covering the sprocket holes that are adjacent the side edge of said film strip that is remote from said reorder strip.

* * * * *